A. S. Keagy,

Land Roller.

No. 101,626.  Patented Apr. 5, 1870.

Witnesses.
E. M. Anderson
Chas. Kenyon

Inventor.
A. S. Keagy,
Chipman, Hosmer & Co,
Attorneys.

United States Patent Office.

A. S. KEAGY, OF HARRISTOWN, ILLINOIS.

Lettees Patent No. 101,626, dated April 5, 1870.

IMPROVEMENT IN FIELD-ROLLERS.

The Schedule referred to in these Letters Patent and making part of the same.

*To all whom it may concern:*

Be it known that I, A. S. KEAGY, of Harristown, in the county of Macon and State of Illinois, have invented a new and valuable Improvement in Field-Rollers; and I do hereby declare that the following is a full, clear, and exact description of the construction and operation of the same, reference being had to the annexed drawings making a part of this specification, and to the letters and figures of reference marked thereon.

Figure 1:
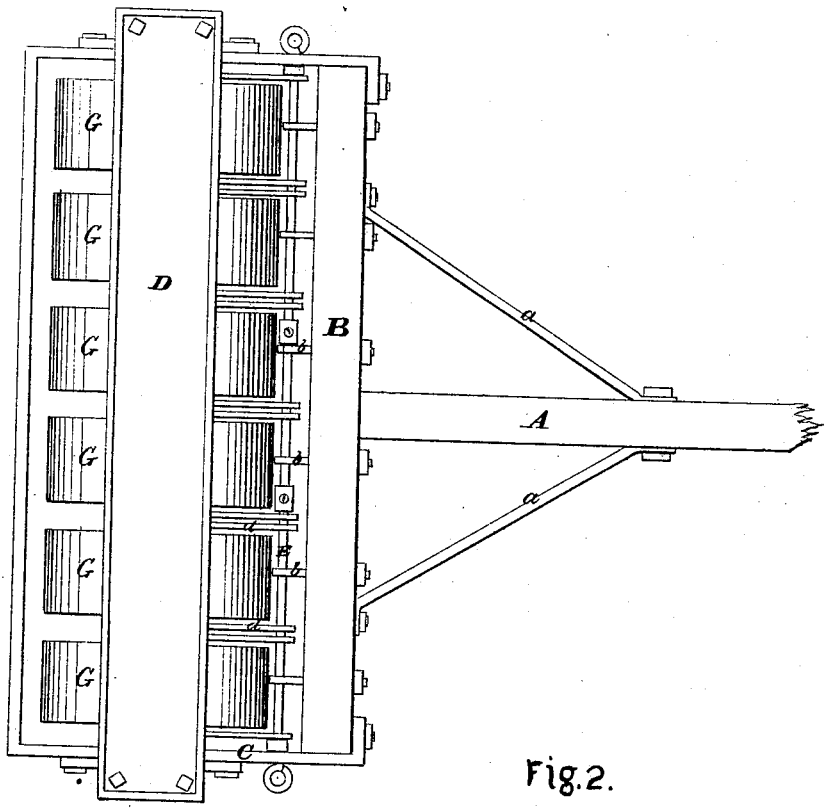

Figure 1 of the drawings is a top view of my invention.

Figure 2:
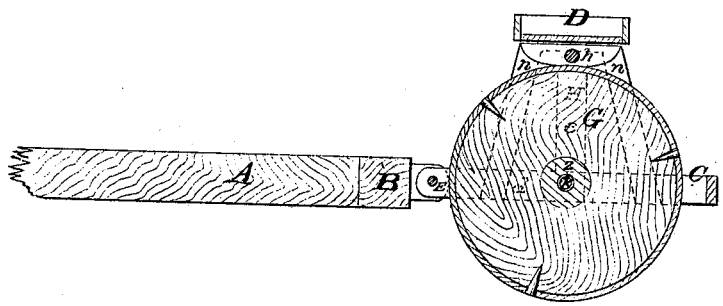

Figure 2 is a vertical section thereof.

My invention relates to field-rollers, and consists, mainly, in the construction and novel arrangement of devices, whereby a number of rollers are combined in the same machine, and arranged to operate independently of each other.

The letter A of the drawings designates the pole of the carriage.

B, the transverse beam to which it is secured by tenon and mortise, and braced by the rods $a\ a$.

C designates the horizontal frame which passes around the rollers.

D represents a trough for conveying stones, trash, &c., out of the field, and serving also as a seat for the driver.

E is a long rod extending from one end of the carriage to the other, and secured to the sides of the frame C and to the bearing-pieces $b\ b$ fastened to the beam B.

G G designate the rollers, each one of which is fixed in a separate frame composed of two side pieces H H, connected together by the rod $h$ at the top, and by the axle of the roller.

The side pieces H H are right angles, and the axle $k$ is screwed firmly into each at the angular point.

The horizontal arms $d\ d$ are pivoted to the transverse rod E, and the upright arms $e\ e$ are expanded at their upper ends, and abut under the seat or trough D, thereby serving to give the rollers evenness of movement on level ground, and to prevent the trough from touching them.

The rear horizontal bar of the frame C serves as a scraper to detach the soil from the rollers. If it be desired to remove this bar further to the rear, scrapers may be attached to it for this purpose.

The trough D is supported at each end by the standard $n$. When necessary the trough may be weighted to operate on hard soil.

This roller is designed to be drawn by a span of horses. Each section, being independent in its construction, does not interfere with the operation of the others, and thus, while one or more of the rollers may be passing over a large clod, stump, or other obstruction, the other rollers will continue to operate on the level ground, or in any depression thereof. The machine is easily turned, as in this operation a part of the rollers can reverse their motion. Thus it can be turned around its central point if necessary. Either or several of the sections can be removed when it is desired to leave certain portions of the ground untouched.

The axles pass through boxes $z\ z$ in the rollers, thereby securing strength and uniformity of work.

The whole machine can be taken to pieces and readily boxed for transportation.

What I claim as my invention, and desire to secure by Letters Patent, is—

1. The field-roller herein described, consisting of the sectional rollers G G, arranged to move abreast of each other, but each having an independent upward or downward motion, as specified.

2. The field-roller herein described, having sectional rollers G G turning upon independent axles $k\ k$ screwed into the independent frames H H connected to the horizontal rod E by the arms $d\ d$, and provided with the upright arms $e\ e$, arranged to support the trough or seat D, as specified.

In testimony that I claim the above, I have hereunto subscribed my name in the presence of two witnesses.

A. S. KEAGY.

Witnesses:
J. F. PECK,
M. B. KEAGY.